Figure 1:
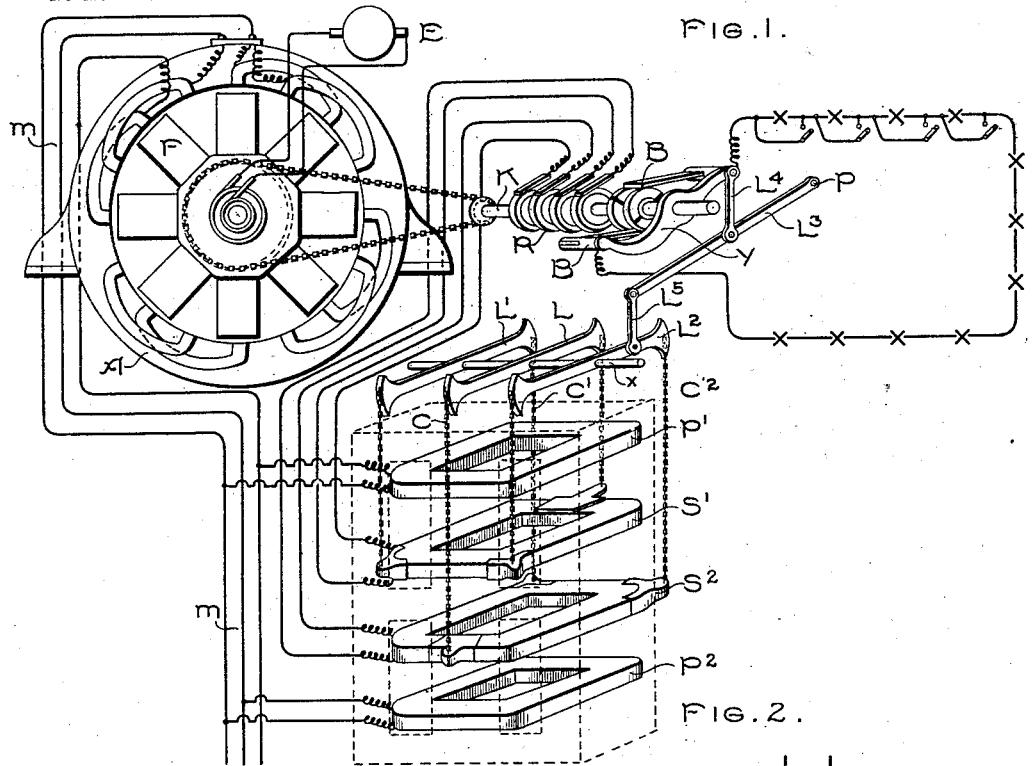

No. 723,189. PATENTED MAR. 17, 1903.
E. THOMSON.
RECTIFYING ALTERNATING CURRENTS.
APPLICATION FILED AUG. 12, 1902.

NO MODEL. 2 SHEETS—SHEET 1.

WITNESSES:

INVENTOR:
Elihu Thomson.
by
ATT'y.

No. 723,189. PATENTED MAR. 17, 1903.
E. THOMSON.
RECTIFYING ALTERNATING CURRENTS.
APPLICATION FILED AUG. 12, 1902.
NO MODEL. 2 SHEETS—SHEET 2.
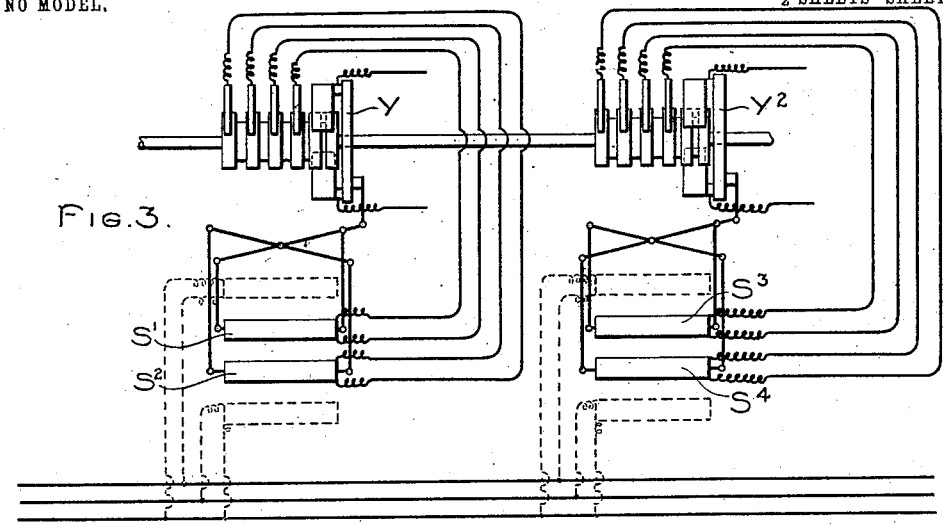
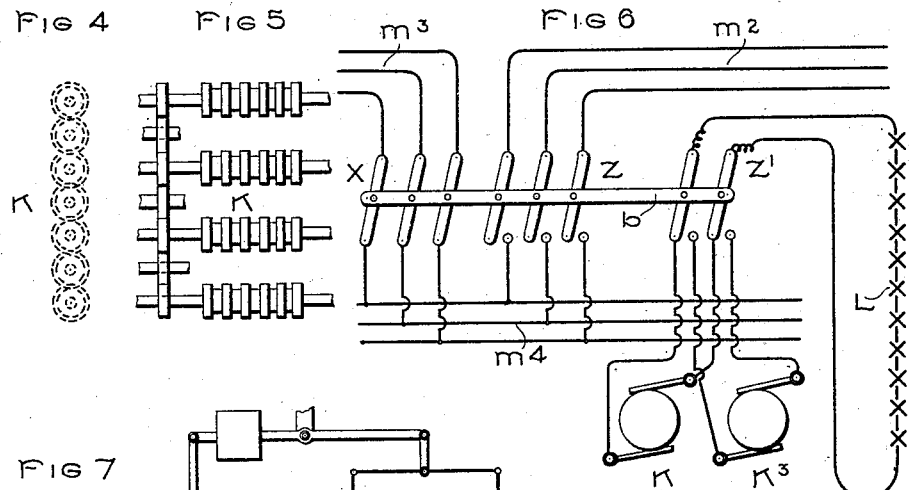
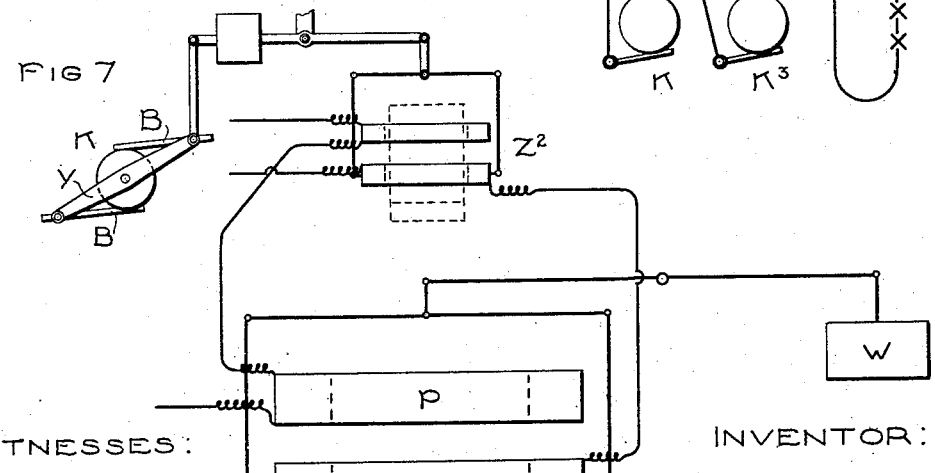
WITNESSES:
INVENTOR:
Elihu Thomson.

UNITED STATES PATENT OFFICE.

ELIHU THOMSON, OF SWAMPSCOTT, MASSACHUSETTS, ASSIGNOR TO THE GENERAL ELECTRIC COMPANY, A CORPORATION OF NEW YORK.

RECTIFYING ALTERNATING CURRENTS.

SPECIFICATION forming part of Letters Patent No. 723,189, dated March 17, 1903.

Original application filed December 15, 1898, Serial No. 699,351. Divided and this application filed August 12, 1902. Serial No. 119,437. (No model.)

*To all whom it may concern:*

Be it known that I, ELIHU THOMSON, a citizen of the United States, residing at Swampscott, in the county of Essex, State of Massachusetts, have invented certain new and useful Improvements in Rectifying Alternating Currents, (Case No. 3,052, division of my prior application, Serial No. 699,351, filed December 15, 1898,) of which the following is a specification.

In order to obviate or reduce to a minimum the amount of sparking which may take place in the operation of rectifying devices for changing an alternating current of any particular character to a unidirectional current, it is necessary that the commutation or periodic disconnection of the alternating mains from the work-circuit carrying the unidirectional current should take place at such points in the wave of the alternating current or currents as will result in the smallest value of unbalanced electromotive force acting between the terminals of the respective circuits as they are being separated. If the relative positions of the commutator and brushes of the rectifying device at the instant of commutation bear a fixed relation in point of time to some particular phase value of the impressed alternating electromotive force, it will be evident that as the load changes in the work-circuit the instant at which commutation takes place will occur at different points or values in the current-wave, owing to the fact that the change in impressed electromotive force or effective resistance of the work-circuit produces a change in the phase relations between the impressed alternating electromotive force and current, wherefrom it follows that if the brush adjustment in the rectifying device be suitable for one particular load it becomes unsuitable for a different load or loads. I have discovered that by automatically varying the times at which commutation takes place in accordance with varying load such relations may be maintained between the electromotive forces acting at the instant of commutation as will result in a minimum amount of sparking of the rectifying device through its entire range of operation. I consider myself the first to devise a method for accomplishing this result, and I intend hereinafter to lay claim to the same broadly.

Although in the following description and accompanying drawings I have set forth an arrangement of apparatus suitable for carrying out my invention, it will be evident that my invention in its broader aspects is not in any sense limited to the employment of the particular apparatus shown, but may be embodied in and its beneficial results obtained from the employment of many similar arrangements whether the same be in their action electrical or largely mechanical. In short, my invention comprises the broad idea of causing the operation of commutation in a rectifying device to be automatically made at such variable instants with respect to the phase of the impressed electromotive force as may be necessary to secure a minimum amount of sparking with changes of load.

The brushes and commutator of a rectifying device such as I employ are relatively movable with respect to each other; but so far as my invention is concerned either of them may be fixed in space and the other movable with respect thereto, the adjustment between the same being performed in any desired manner, one method of doing which I have hereinafter shown.

Figure 2:
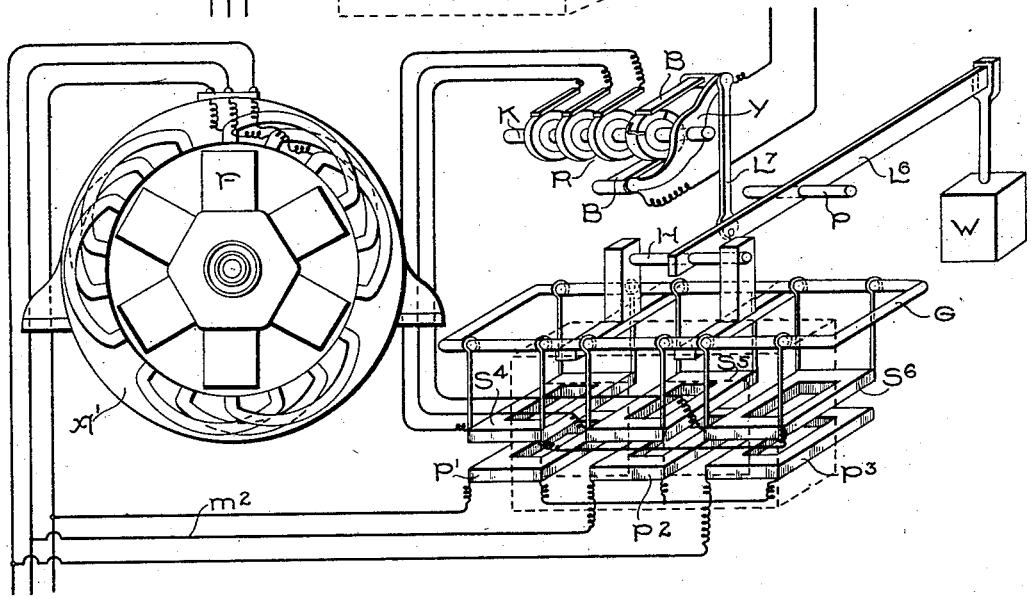

In the drawings, Figure 1 illustrates in diagram a rectifying device supplied with constant current and operating in accordance with my invention, the constant current being derived from the secondaries of two-phase constant-current transformers. Fig. 2 illustrates a similar arrangement applied in connection with three-phase apparatus. Fig. 3 shows a system in which a plurality of rectifying devices are operated from the same distributing-mains. Figs. 4 and 5 represent a plurality of commutating devices mechanically geared together so as to maintain a constant ratio between their relative rates of rotation. Fig. 6 illustrates diagramatically a switching-over apparatus for putting a work-circuit in connection with any one of a plurality of rectifying-circuits, and Fig. 7 illustrates one form of brush-actuating mechanism which may be employed in carrying out my invention.

The alternating currents to be rectified may be derived from any suitable source whether single phase or multiphase and whether generated in that form directly or converted into that character by suitable transforming apparatus.

In Fig. 1 I have illustrated a two-phase generator A, from which the current to be rectified is derived. So far as my invention is concerned the construction of the generator is immaterial; but it is preferably of the direct-driven slow-speed multipolar type now commonly employed. The generator has the usual revolving field F, connected through collector-rings with the exciter E for furnishing current thereto. The stationary member of the generator carries two sets of angularly-displaced windings in which currents differing in phase by ninety degrees are induced. These windings are interconnected in the ordinary manner, and mains $m$ are connected thereto and lead to a distribution system from which current may be derived for any desired purpose—such as operating motors, lights, or other translating devices. From the distributing-mains $m$ $m$ connections are made to the primary coils $P'$ $P^2$ of a constant-current transformer of the type operating by mutual repulsion of the primaries and secondaries of the same. The relative motion between the primary and secondary windings of a transformer of this type incident to changes of load in the circuit supplied by the secondary windings of the same is utilized to suitably shift the brushes which operate in connection with the rectifying device for changing the secondary alternating current into a unidirectional current. The movable secondary coils of the transformer are shown at $S'$ $S^2$. The core of the transformer is indicated in dotted lines. The secondary coils, as before stated, are relatively movable with respect to their respective primary coils, and in order to make the movement of each coil even, as well as dependent upon the movement of the other, I mount the said secondary coils in connection with some suitable system of mechanical devices, whereby the movement of one secondary coil toward its primary is communicated to the other secondary coil in such manner as to produce a similar movement of the latter coil. In Fig. 1 I have shown one arrangement of apparatus for accomplishing this purpose, the same consisting of balancing-levers L $L'$ $L^2$, to which the secondary coils are connected by flexible or link connections, as shown. The levers L $L'$ $L^2$ referred to are separately mounted, so as to turn about the rod $x$ as a fulcrum, or they may, if desired, be arranged on knife-edges, as may be preferred, the particular construction being a mere matter of mechanical detail. One end of the lever L supports one side of the secondary coil $S'$, while its opposite end supports one side of the other secondary coil $S^2$. The other ends of the respective secondary coils $S'$ $S^2$ are supported through suitable connections from the opposing ends of the two levers $L'$ $L^2$, as shown. These connections are so made and adjusted that the weight of the secondary coil $S^2$ overbalances that of the secondary coil $S'$, with the result that when there is no current flowing the respective secondaries $S'$ $S^2$ are brought closely adjacent to their respective primaries. It will be observed that the downward pull due to the secondary $S^2$ acts, through the chain C and lever L, to raise one end of the secondary coil $S'$, while the downward pull exerted by the secondary $S^2$ on its supporting-chains $C'$ $C^2$ acts, through the levers $L'$ $L^2$, to raise the opposite end of the secondary $S'$. As regards the operation of this transformer it will suffice for the present purpose to state that as the resistance in the secondary circuit increases the current supplied thereto consequently tends to decrease, with the result that the secondary coils approach their respective primary coils, being no longer repelled by the same force as before. By this action the flux through the secondary coils is increased, thus causing an increase in secondary electromotive force and so tending to preserve a constant current in the secondary. The currents in the transformer-secondaries are conducted by suitable leads to a rectifying device K. The rectifying device may be directly mounted on the shaft of the prime mover, or it may be suitably geared thereto, as shown, or it may be driven by a synchronous motor, as may be desired. Suitable contact-rings R, carried upon the shaft of the commutating device and insulated therefrom and from each other, are connected to the respective terminals of the secondary windings, as shown. Each ring in its turn is connected to the corresponding segments of a two-phase commutator similar to the commutator in the Brush arc-lighting machine. One set of commutator-segments is connected, through the corresponding rings R, with one of the secondary coils of the transformer. Another set of commutator-segments angularly displaced on the same shaft carrying the first set is connected, through other rings, with the other secondary coil. The breaks in one commutator come opposite the middle points in the conducting portions of the other commutator. As the present invention has no special reference to the particular form of commutator employed, a more detailed description of the same is unnecessary. Brushes B B, carried by a suitable yoke Y, bear upon the commutators, each brush making contact simultaneously with each commutator, as shown. The yoke Y is arranged to be rotated through a limited arc about the axis of rotation of the commutator in order to secure the proper adjustment necessary to a sparkless operation of the same, as has been explained. In order to render this adjustment automatic with changes of load in the work-circuit, suitable mechanical connections are made between the yoke Y and the moving secondaries of the transformer the currents from which are to be rectified. Many suitable devices for accomplishing this purpose may be produced, and in Fig. 1 I have shown one arrangement which I have found desirable. This arrangement consists of the lever $L^3$, fulcrumed at some fixed point, as $p$, and connected from an intermediate point of the same to the yoke Y by the link $L^4$. The free end of the lever $L^3$ is connected by the link $L^5$ with some one of the oscillating levers L L' $L^2$—as, for example, the lever $L^2$. In the operation of these mechanical connections it will readily be seen that the reciprocating motion of the secondary coils $S'$ $S^2$ of the transformer consequent upon changes of load in the circuit supplied thereby is transformed into an oscillating motion and is communicated to the yoke Y, carrying the brushes B. By proper attention to the mechanical design of this structure the motion communicated to the yoke Y may be made such as to shift the brushes B backward and forward as the load changes in such a manner as will result in a minimum amount of sparking at the commutator. It is obvious that the motion of the secondary coils may be communicated to the brushes B in any other manner than that shown, either directly or indirectly, as found most convenient.

In Fig. 2 I have shown an apparatus for rectifying three-phase currents, the device for performing this function being somewhat different from the arrangement of apparatus shown in Fig. 1. A three-phase generator A' or any other source of three-phase current is used to supply energy to the three-phase constant-current transformer, such as shown in Fig. 2. Three primary coils P' $P^2$ $P^3$ are interconnected in the usual manner and receive their energy through leads $m^2$ of the three-phase system. It is evident, of course, that the three-phase currents in the mains $m$ may be supplied to any other translating devices desired without involving any departure from my invention. Associated with the primary coils of the transformer are corresponding secondary coils $S^4$ $S^5$ $S^6$, mounted upon a suitable framework G and movable relatively to the primary coils. Both primary and secondary coils encircle suitable legs or branches of the transformer-core. (Shown in dotted lines.) The frame G is connected through suitable cross-bars and uprights with one end of the lever $L^6$, the connections with the lever being made by means of the shaft H, movable within an opening in said lever. The lever $L^6$ is fulcrumed in a suitable manner at $p$, and the weight of the secondary coils of the transformer is nearly but not quite balanced by the weight W, arranged to slide on one arm of the lever $L^6$. Currents from the secondary coils are transmitted through suitable conductors to brushes bearing upon the collector-rings R of the rectifying device K, which may be driven in any well-known manner. The rings are respectively connected to the segments of the commutator for rectifying the three-phase current. The rectified current is collected by brushes B and transmitted to the work-circuit, supplying arc-lamps or the like. The brushes B, similarly to the construction shown in Fig. 1, are carried by a yoke Y, the latter being connected, as shown, by a link $L^7$ to some convenient point in the length of the lever $L^6$. The repulsion of the secondary coils of the transformer by the primaries acts, as in the form shown in Fig. 1, to communicate motion through the lever $L^6$ to the yoke Y and so to adjust the position of the brushes B. By suitable proportioning and adjustment of parts the brushes B may be maintained in the position of minimum sparking throughout the limits of load variation of the apparatus. It is obvious that the arrangement of levers shown might be radically varied without in any way departing from the principle of my invention.

Fig. 3 indicates diagrammatically a plurality of rectifying commutators having a fixed ratio of rotation such as would be obtained, for example, by mounting them upon the same shaft. The brush-carrying yokes Y and $Y^2$ are actuated in the manner previously described, the movements of the secondary coils $S'$ $S^2$ actuating the yoke Y of one commutator and the movements of the set of secondary coils $S^3$ $S^4$ actuating the yoke $Y^2$ of the other commutating device, the primaries corresponding to these secondary coils being excited from the same distribution system, as shown.

Instead of mounting the respective rectifying sets on the same shaft it is equally feasible to mount each set upon a separate shaft, the individual shafts being connected by suitable gearing, such as spur-wheels or other positively-acting devices of an appropriate nature for maintaining a fixed ratio of rotation between the individual rectifying commutators, as shown in Fig. 5.

Where rectifying apparatus is to be operated continuously or at least throughout long intervals, as in commercial practice, it is advisable from motives of prudence to follow the common engineering practice of providing reserve sets of apparatus to take the place of the apparatus in use in the event of injury or accident to the same, thus obviating otherwise vexatious and annoying delays in service. In the employment of reserve apparatus it is desirable to provide change-over switches for substituting the connections of the reserve apparatus for those of the apparatus to be cut out of circuit. In Fig. 6 I have illustrated an arrangement of switches and circuits for accomplishing this result. The mains supplying the alternating current to be rectified are shown at $m^4$ and two sets of connections are taken therefrom, one set of which may be put in circuit with the mains $m^3$ through the switch X, while the other set of connections may in similar manner be put in circuit with the mains $m^2$ through the switch Z. The circuit $m^3$ is intended to supply the primary of the transformer, the secondary of which supplies current to the rectifying device K. In similar manner the circuit $m^2$ supplies the primary of the transformer, the secondary of which furnishes current to the rectifying device $K^3$. The switch Z' is intended to connect either one of the two commutating devices K $K^3$ with the work-circuit supplying lamps L. The switches X Z Z' are mechanically connected in some suitable manner, so as to be operated simultaneously—as, for example, by the connecting-bar $b$. As the connections are shown in Fig. 6 the rectifying device K is connected through its transformer (not shown) with the mains $m^3$ and through the switch X with the distributing-conductors $m^4$. The commutator of the rectifying device K is connected through the switch Z' with the work-circuit, as shown. In case of accident to the set of apparatus thus in circuit the switches X Z Z' may be thrown, thus cutting out this apparatus and putting in circuit the rectifying device $K^3$ with its similar set of supply devices, as will be readily understood.

Instead of shifting or adjusting the brushes of the rectifying apparatus through motion derived from the repulsion of the windings of the main supply-transformer I sometimes prefer to employ a device, the purpose of which is primarily to operate the brush-shifting mechanism and not to operate as a transformer, as in the cases above described. In Fig. 7 I have illustrated such an arrangement of apparatus. The primary and secondary of a supply-transformer are shown at P and S and may be either relatively movable or fixed with respect to each other, as may be desired. If the coils are movably related to each other, the weight of one of the coils may be partially counterbalanced by means of a lever and suitable connections with the weight W, as diagrammatically indicated. At $Z^2$ is illustrated the actuating mechanism for adjusting the brushes of the rectifying device K. This device consists of two relatively movable coils, the force exerted between which is communicated through suitable levers and links with the brush-carrying yoke Y. Through one of the coils the current from the secondary S of the main transformer passes, while through the other coil is passed the current from the primary P of the main transformer. It will thus be seen that the force exerted between the relatively movable coils of the actuating device is dependent upon the load supplied by the main transformer. By suitable proportioning and arrangement of parts the relative motion of the coils of the brush-shifting device may be so transmitted to the brushes of the rectifying commutator K as always to maintain the same in a position of minimum sparking. If found desirable, the coils of the brush-actuating device may be associated with a core of magnetic material, (indicated in dotted lines.)

Although in the apparatus above described I have illustrated constant-current transformers because of the desirability of obtaining a rectified current of constant volume suitable for use in supplying arc-lights or the like, it will be evident that my invention is not to be limited to the employment of such transformers, for if found desirable I may employ any other type of transformer, or, indeed, I may dispense with the use of transformers altogether. In cases where I do not make use of constant-current transformers of the type described I may substitute for their function as brush-shifting devices any other mechanism suitable therefor, since it will be understood that my invention in its broader aspects is not dependent upon the particular means employed for maintaining a sparkless relation between the parts of the rectifying device when in operation.

What I claim as new, and desire to secure by Letters Patent of the United States, is—

1. The method of rectifying an alternating current of varying power, which consists in allowing the current to vary in power and automatically causing the rectification to take place as the power of the current varies at such phase values of the alternating current as will result in a minimum amount of sparking.

2. The method which consists in generating an alternating current of constant volume passing the same to a rectifying-commutator and shifting the position of brushes on said commutator as the power of said current varies.

3. The method which consists in transmitting an alternating current of constant volume to a rectifying-commutator and automatically shifting the position of brushes on said commutator as the power of said current varies.

4. The method which consists in passing an alternating current to a rectifying-commutator and automatically causing the times of commutation to vary with respect to the phase of the impressed alternating electromotive force.

5. The method which consists in passing an alternating current to a rectifying-commutator, and automatically causing a given relative position of commutator and brushes to occur at non-corresponding points in waves of the impressed alternating electromotive force, separated from each other by various intervals.

6. The method of rectifying an alternating current, which consists in automatically causing the rectification to take place at times corresponding to varying phase values of the impressed alternating electromotive force.

7. The method which consists in generating an alternating current of substantially constant potential, transmitting the same, generating therefrom an alternating current of substantially constant volume, passing the same through a rectifying-commutator, and automatically causing the times of commutation to vary with respect to the phase of the alternating electromotive force impressed on the commutator.

In witness whereof I have hereunto set my hand this 7th day of August, 1902.

ELIHU THOMSON.

Witnesses:
DUGALD MCK. MCKILLOP,
JOHN A. MCMANUS.